May 20, 1930.　　　　D. BAILEY　　　　1,759,082
MARINE STEERING GEAR
Filed May 14, 1929　　3 Sheets-Sheet 3

Inventor
Daniel Bailey
by Morrison, Kennet & Campbell
Attorneys.

Patented May 20, 1930

1,759,082

UNITED STATES PATENT OFFICE

DANIEL BAILEY, OF HASBROUCK HEIGHTS, NEW JERSEY, ASSIGNOR TO MERRITT, CHAPMAN & SCOTT CORPORATION, OF NEW YORK, N. Y., A CORPORATION OF DELAWARE

MARINE STEERING GEAR

Application filed May 14, 1929. Serial No. 363,054.

This invention relates to improvements in marine steering gears, and has for its object the provision of a steering gear—particularly for river and harbor craft—which will facilitate quick maneuvering of a boat with a minimum expenditure of manual effort on the part of the pilot or other helmsman.

Prior to this invention, tug boats, lighters, ferries, and similar vessels have been equipped with steering gears comprising tiller-operating drums which are rotatable manually through the medium of a spoked steering wheel. The drum of such a steering gear carries a number of turns of a rope, cable, or chain, the opposite ends of which run off to the tiller or its equivalent, whereby rotation of the drum, in one direction or the other, will cause the ship's rudder to be swung either to starboard or to port, as the case may be. In order to obtain suitable leverage, the drum is of relatively small diameter as compared with the steering wheel, and usually from three to six revolutions are required to move the rudder from one of its extreme positions to the other. It frequently happens that the rudder must be put "hard over", for example from "hard a-port" to "hard a-starboard", or vice versa, as quickly as possible, and this requires considerable manual effort and time in its performance. But such a maneuver is sometimes difficult in small boats, where the captain is alone in the pilot house, because it takes the captain's attention away from outside environments which he must necessarily watch.

By the present invention, the objectionable features of the prior art steering gears are overcome, and a new steering gear provided which will be extremely simple in construction, rapid and dependable in operation, strong and durable in service, and a substantial advance in the art.

The foregoing and other objects, features, and advantages of the invention will be fully appreciated from the following description in connection with the accompanying drawings, wherein one form of the invention has been shown by way of illustration.

Figure 1:
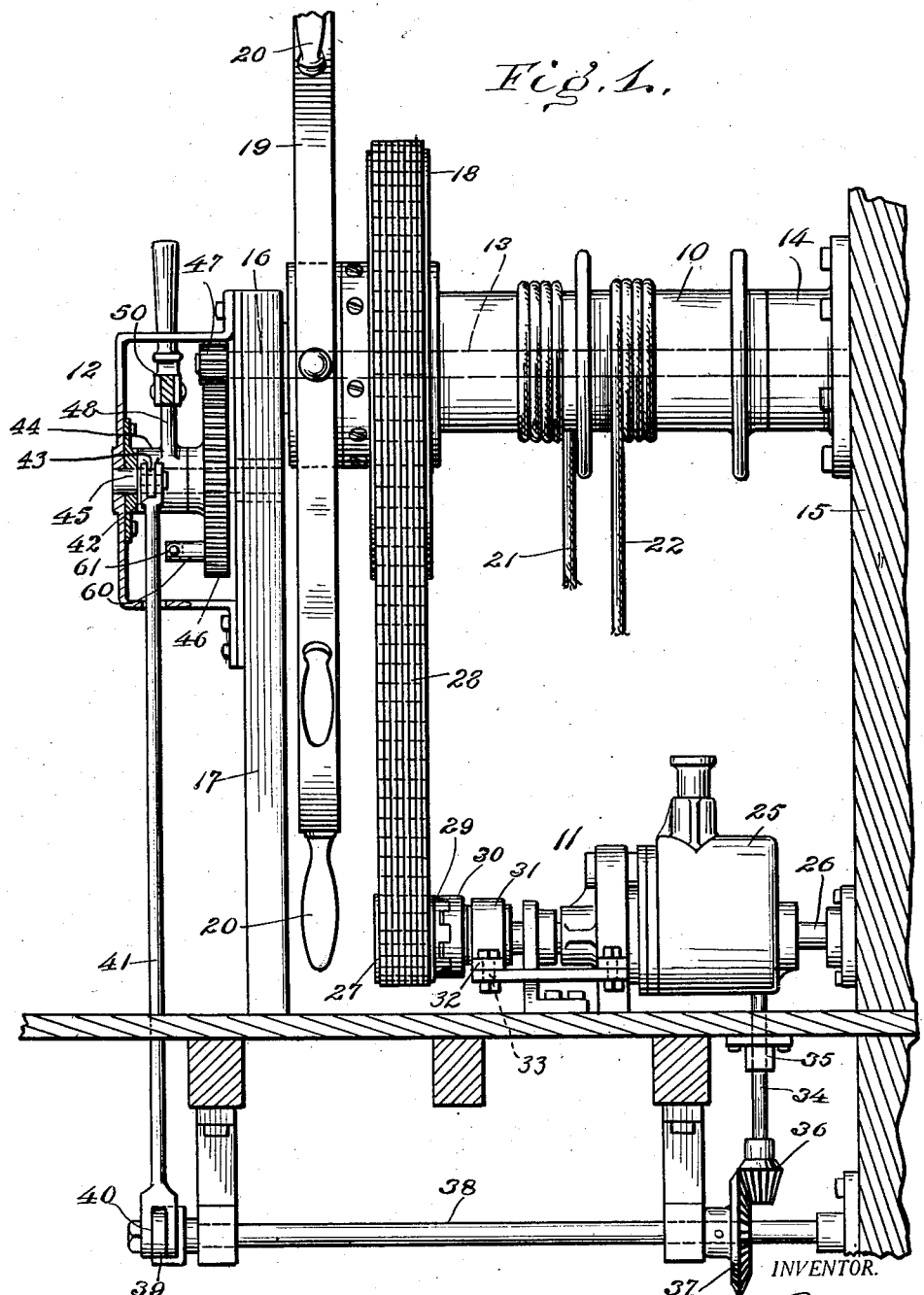
Figure 1 is a side elevation of the improved steering gear, partly in section.
Figure 2:
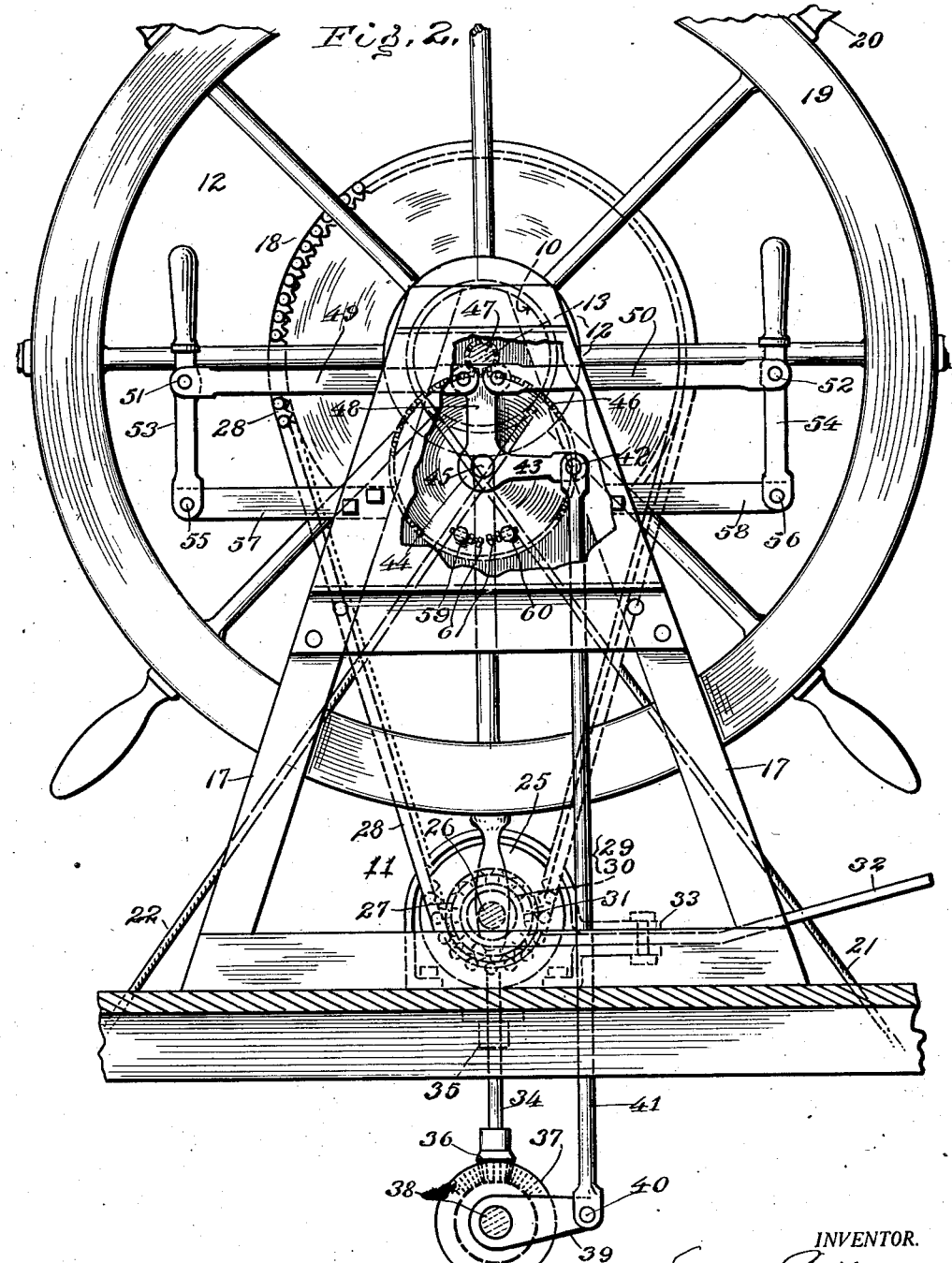
Fig. 2 is a rear view of the same, with the parts in neutral position.
Figure 3:
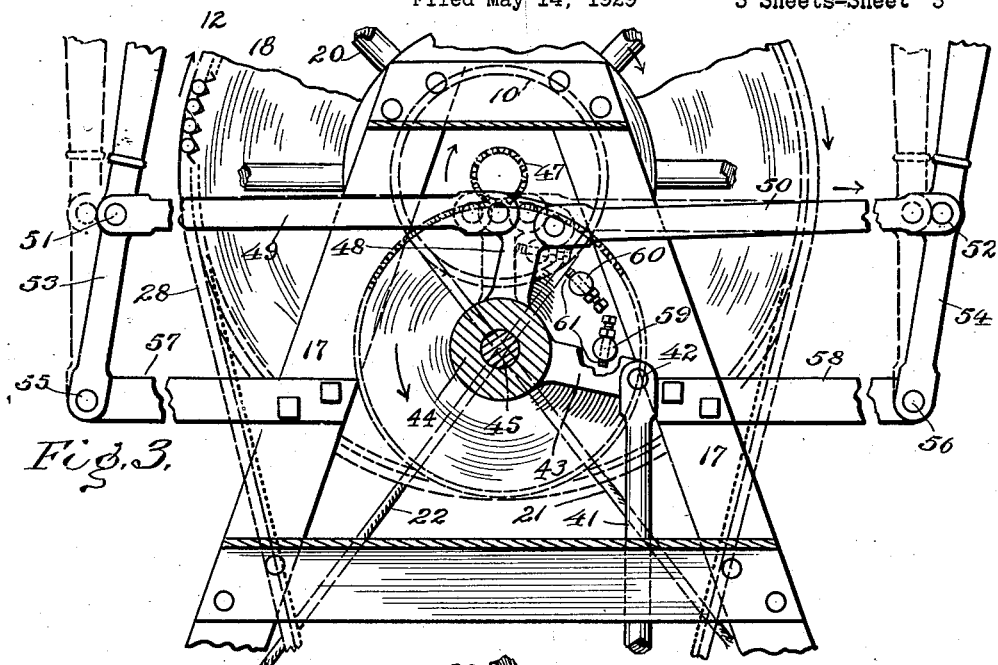
Fig. 3 is a fragmentary view similar to Fig. 2, on an enlarged scale, but showing in full lines the manual control means in the "hard a-port" position.
Figure 4:
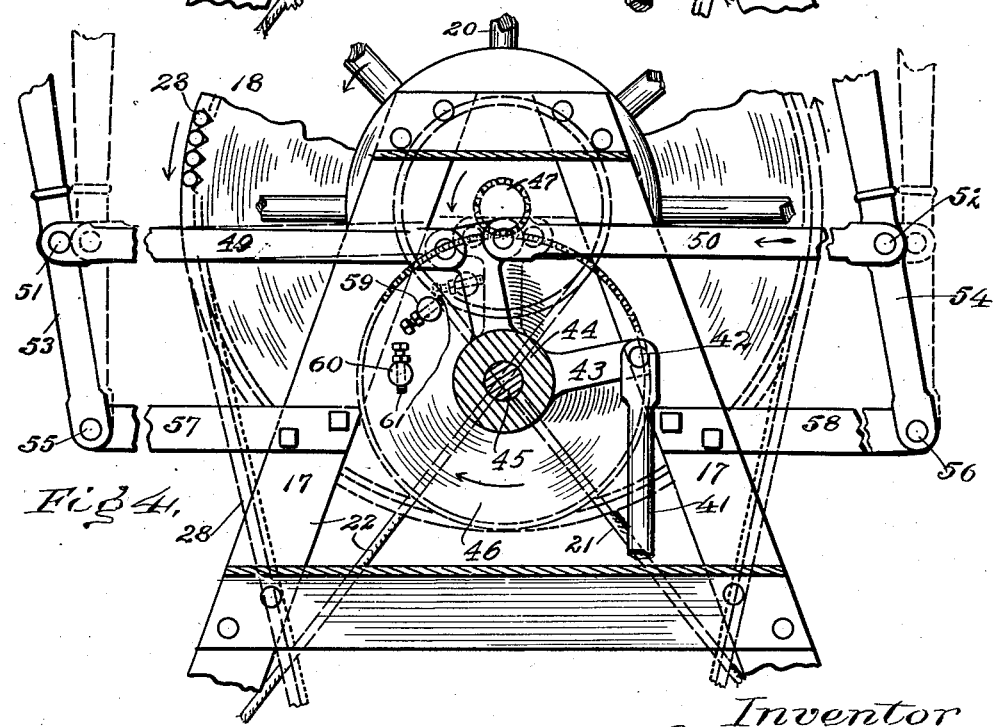
Fig. 4 is a similar view with the parts shown in full lines in the "hard a-starboard" position.

Referring now to the drawings in detail, it will be seen that the improved steering gear comprises essentially a tiller-operating member 10, driven by a power mechanism 11, which is adapted to be started and stopped by a combined manual and automatic control means 12. The tiller-operating member 10 is shown as a drum which is secured to a shaft 13 extending in a fore-and-aft direction, the front end of said shaft being journalled as at 14 on the front wall 15 of the pilot house, and the rear end of said shaft being journalled as at 16 in the upper end of a triangular pedestal 17. Secured to or integral with the drum 10 is a sprocket wheel 18, rearward of which is a steering wheel 19 of usual form having a plurality of hand grips 20 extending radially from its periphery. Two ropes 21 and 22, or cables or chains, each have one of their ends secured to the drum 10, and after being wound around the drum several turns, they run off to suitable guide pulleys (not shown) and are connected to a tiller or the like (not shown) in the usual manner. As best shown in Figs. 2 to 4 inclusive, the ropes 21 and 22 cross each other below the drum as is customary on some ships, but obviously they need not be so disposed. With this illustrated arrangement, movement of the drum and steering wheel in a clockwise direction (as shown in Fig. 2) will steer the ship to port, and movement in a counter-clockwise direction will steer the ship to starboard.

The power mechanism 11 has been illustrated in the form of a pneumatic motor 25 which by being supplied with compressed air or other pressure fluid, will rotate a shaft 26, at one end of which is a small sprocket wheel 27 rotatable in the same plane as that of the sprocket wheel 18. These two sprocket wheels 18 and 27 are connected together by a link belt, or what is known as a silent chain, 28, so that as the sprocket 27 is driven by the motor 25, the drum 10 will be rotated. Associated with the sprocket wheel 27 is a clutch member 29, which is adapted to cooperate with another clutch member 30, splined to the shaft 26 and adapted to be moved longitudinally into and out of driving relation with the clutch member 29 through the medium of a shifting yoke 31. The yoke 31 may be of any ordinary or preferred form well known to skilled mechanics, and may be actuated by means of a lever 32 pivoted as at 33 adjacent to the deck of the pilot house. Preferably, the lever 32 is of such a character that it may be most conveniently operated by the pilot's foot, although of course, it may be otherwise formed for actuation by hand if desired.

The pneumatic motor 25 is preferably of the reversible type, and may be controlled through the medium of an ordinary valve (not shown), which may be adjusted by a shaft 34 which extends outside of the motor casing. In the illustrated embodiment this shaft extends through the deck of the pilot house, and is journaled in a bushing 35 and provided on its lower extremity with a bevelled pinion 36, which meshes with a bevelled gear 37 on the forward end of a fore-and-aft shaft 38 mounted in suitable bearings beneath the deck of the pilot house. The rear end of the shaft 38 is provided with a crank arm 39 to which is pivotally connected as at 40, the lower end of an operating link 41. The upper end of the link 41 is connected as at 42 to one arm 43 of a bell crank lever 44. This bell crank lever 44 is adapted to freely oscillate about a shaft 45, which is offset from the shaft 13 and suitably journalled at the rearward side of the pedestal 17. Also freely rotatable on said shaft 45, is a spur gear 46 which meshes with a small pinion 47 on the rearward end of the shaft 13.

A second arm 48 of the bell crank lever 44 extends upwardly as best shown in Figs. 2 and 3, and has connected to its upper end, the inner ends of links 49 and 50 which extend outwardly in opposite directions from the axis of said arm. These links 49 and 50 are pivotally connected at their outer ends as at 51 and 52 respectively with hand levers 53 and 54, which in turn are pivotally mounted at 55 and 56 on suitable supporting arms 57 and 58, extending laterally from the pedestal 17. Thus by movement of either of the levers 53 or 54 in one direction, the pneumatic motor 25 will be caused to rotate in a definite direction to actuate the drum 10 in one direction, and by movement of either of said levers in the opposite direction, the motor 25 will correspondingly be caused to rotate in the opposite direction. Thus by very slight movement of the hand levers, the pilot can control the operation of the motor 25, and put the rudder of the vessel hard over from one extreme position to the other.

It is desirable to provide means whereby the operation of the motor 25 will be automatically stopped when the rudder reaches its extreme position in either direction. For this purpose the arm 48 of the bell crank lever 44 is disposed in a different plane from that of the arm 43, and the gear 46 is provided with a pair of rearwardly projecting pins 59 and 60, which upon rotation of the gear are adapted to move in the plane of said arm 48. Each of these pins 59 and 60 is provided with an adjustable set screw 61, one end of which is adapted under certain conditions, to engage the corresponding edge of the bell crank arm 48. Thus as the drum 10 is rotated by the motor 25 as previously explained, the pinion 47 drives the gear 46, the speed of said gear being considerably less than that of the pinion 47. As the rudder reaches its limit of movement however, the end of one of the set screws 61 will engage the bell crank arm 48 and reset said arm to its normal vertical position, and by such movement it will act through the medium of link 41, crank arm 39, shaft 38, gears 37 and 36 and shaft 34 to actuate the motor valve and stop the motor.

It is believed that the operation of the improved steering wheel will be clear from the foregoing description, but brief recapitulation will now be given. Assuming that the ship is going forward on a straight course, the parts of the mechanism will be disposed in the relationship shown in Fig. 2. If it is now desired to change the ship's course towards the port side, either one of the hand levers 53 or 54 may be manually moved towards the starboard side to the position shown in full lines in Fig. 3, whereupon the motor 25 will be caused to rotate to turn the tiller rope drum 10 in a clockwise direction as viewed in Fig. 2. The amount that the rudder is moved can be easily controlled by the pilot, because he can reset the hand levers 53 and 54 as soon as it may seem desirable to him. If however, it is desired to put the rudder hard over, the pilot need not concern himself about manually resetting the said hand levers, but he may depend upon the automatic control to stop the motor 25 at the proper time. If it is desired to change the course of the vessel toward the starboard side, the hand levers 53 and 54 can be manually shifted to the position indicated by full lines in Fig. 4, whereupon the operation of the power mechanism is carried on in the same manner but in the opposite direction to that previously explained.

In changing the course of the vessel from hard a-port to hard a-starboard, the same slight movement of the hand is all that is necessary, and thus the pilot is left free to observe outside conditions, and is not required to expend a great deal of effort in turning the steering wheel 19.

By means of the clutch members 29 and 30, the power mechanism 11 can be readily disconnected from the tiller operating means, leaving the manual steering of the ship available in the event that the power mechanism should become inoperative for any reason. Obviously, of course the novel power mechanism and its hand controlled and automatic stopping means need not necessarily be associated with the ordinary steering wheel as shown in the illustrated embodiment. If desired, it may be built as a separate unit for association with any form of tiller operating member without a hand steering wheel 19. Furthermore, other changes may be made in the minor details of construction and arrangement of parts, and the right is herein reserved to make such changes as fall within the scope of the appended claims without departing from the spirit of the invention.

Having thus described my invention, what I claim is:—

1. In or for a steering gear, a rotatable tiller-operating member, a motor mechanism for rotating said tiller-operating member in opposite directions, a pinion rotatable with the tiller-operating member, a gear meshing with said pinion, a hand-controlled lever adapted to rock on the axis of said gear adjacent to the plane thereof, means connected with and operable by said hand-controlled lever for controlling the starting and stopping of the motor mechanism, and a projecting element carried by said gear and adapted to engage said hand-controlled lever to rock the same, whereby to automatically stop the motor mechanism when the tiller-operating member reaches a predetermined limit of movement in either direction.

2. In or for a steering gear, a rotatable tiller operating member, a reversible fluid pressure motor for rotating said tiller-operating member in opposite directions, a pinion rotatable with the tiller-operating member, a gear meshing with said pinion, a hand-controlled lever adapted to rock on the axis of said gear adjacent to the plane thereof, means connecting said lever with a valve to control starting and stopping of the said motor, and a projecting element carried by said gear and adapted to engage said hand-controlled lever to rock the same, whereby to automatically actuate the valve and stop the motor when the tiller-operating member reaches a predetermined limit of movement in either direction.

3. In or for a steering gear, a tiller-rope drum, a steering wheel secured to the shaft thereof for manually turning said drum in opposite direction, a reversible fluid pressure motor, means including a clutch forming a driving connection between said motor and the drum, whereby to rotate the drum by power, a pinion rotatable with the drum and steering wheel, a gear meshing with said pinion, a two-armed bell-crank lever adapted to rock about the axis of said gear adjacent to the plane thereof, a hand lever connected to one arm of said bell-crank lever for rocking the same, means connecting the other arm of said bell-crank lever with a control valve of said motor, and a projecting element carried by said gear and adapted to engage one arm of the bell-crank lever to rock the same, whereby to automatically stop the motor when the tiller-operating member reaches a predetermined limit of movement in either direction.

4. In or for a steering gear, the combination of a rotatable tiller-operating member, a motor mechanism for rotating said member in opposite directions, a member rotatable with the tiller-operating member, a hand-controlled lever rockable in a plane parallel with that of the rotatable member, means connected with and operable by said lever for starting and stopping the motor mechanism, and a projecting element carried by said rotatable member in position to engage directly the hand controlled lever to rock the same; whereby the motor mechanism will be automatically stopped when the tiller-operating member reaches a predetermined limit of movement in either direction.

In testimony whereof, this specification has been duly signed by:

DANIEL BAILEY.